March 28, 1950 V. H. VOGEL 2,502,396

AUTOMATIC CONTROL OF RADIO TRANSMITTERS AND THE LIKE

Filed Sept. 11, 1946 3 Sheets-Sheet 1

INVENTOR
VERNON H. VOGEL
BY John J. Rogan
ATTORNEY

March 28, 1950 — V. H. VOGEL — 2,502,396

AUTOMATIC CONTROL OF RADIO TRANSMITTERS AND THE LIKE

Filed Sept. 11, 1946 — 3 Sheets-Sheet 2

VERNON H. VOGEL
INVENTOR

BY John J. Rogan
ATTORNEY

March 28, 1950 V. H. VOGEL 2,502,396

AUTOMATIC CONTROL OF RADIO TRANSMITTERS AND THE LIKE

Filed Sept. 11, 1946 3 Sheets-Sheet 3

VERNON H. VOGEL
INVENTOR

BY John J. Logan
ATTORNEY

Patented Mar. 28, 1950 2,502,396

UNITED STATES PATENT OFFICE 2,502,396

AUTOMATIC CONTROL OF RADIO TRANSMITTERS AND THE LIKE

Vernon H. Vogel, Cedar Rapids, Iowa, assignor to Collins Radio Company, Cedar Rapids, Iowa, a corporation of Iowa Application September 11, 1946, Serial No. 696,188

16 Claims. (Cl. 250—17)

This invention relates to automatically-controlled transmitters and more especially to automatic tuning and antenna loading arrangements therefor.

A principal object of the invention is to provide an improved automatic control system for tuning the amplifier and antenna circuits of a radio transmitter, and for adjusting the loading of the final amplifier.

Another object is to provide an automatic adjusting system for the final amplifier stage of a radio transmitter or the like, wherein a number of separate tuning adjustments are sequentially and automatically effected under control of a common phase discriminator device.

Another principal object is to provide a motor driven tuning control in conjunction with a phase-sensitive discriminator and novel automatic control circuits, whereby false operation of the controls which might arise during the unused rotational arc of the tuning condensers, is avoided.

A feature of the invention relates to a special form of phase discriminator and automatic stepping switch in conjunction with a series of driving motors for the several adjustments of a radio set, whereby the discriminator is connected successively to said motors to determine the direction and extent of rotation.

Another feature relates to a plural motor adjusting system for radio sets, whereby successive adjustments of the set are effected under control of the resonant conditions in the set, together with a test discriminator of the phase comparison type which is provided with a special checking arrangement, so that if the comparison voltage is insufficient to control the tuning motor, the motor automatically continues its rotation until brought within the resonant range of the associated part of the set.

Another feature relates to improvements in automatic tuning arrangements responsive to resonance conditions in a radio set, whereby the tuning motor is controlled by the resonance voltage, and also is controlled separately by a voltage which is independent of the resonance voltage. As a result of this feature, the automatic tuning arrangement operates satisfactorily even though such devices as tuning condensers of the 360° rotational type are employed, which are effective for tuning during one-half or less of their complete rotation.

Another feature relates to a novel organization of electron tubes and motor control circuits, with improved checking and interlocking arrangements for insuring accuracy and reliability in the automatic tuning and loading of the final amplifier stage of a radio transmitter and the like.

A still further feature relates to the novel organization, arrangement and relative interconnection of parts which cooperate to provide an improved motor control arrangement for the automatic adjustment of radio sets and the like.

Other features and advantages not specifically enumerated will become apparent after a consideration of the following detailed descriptions and the appended claims.

Figure 1:
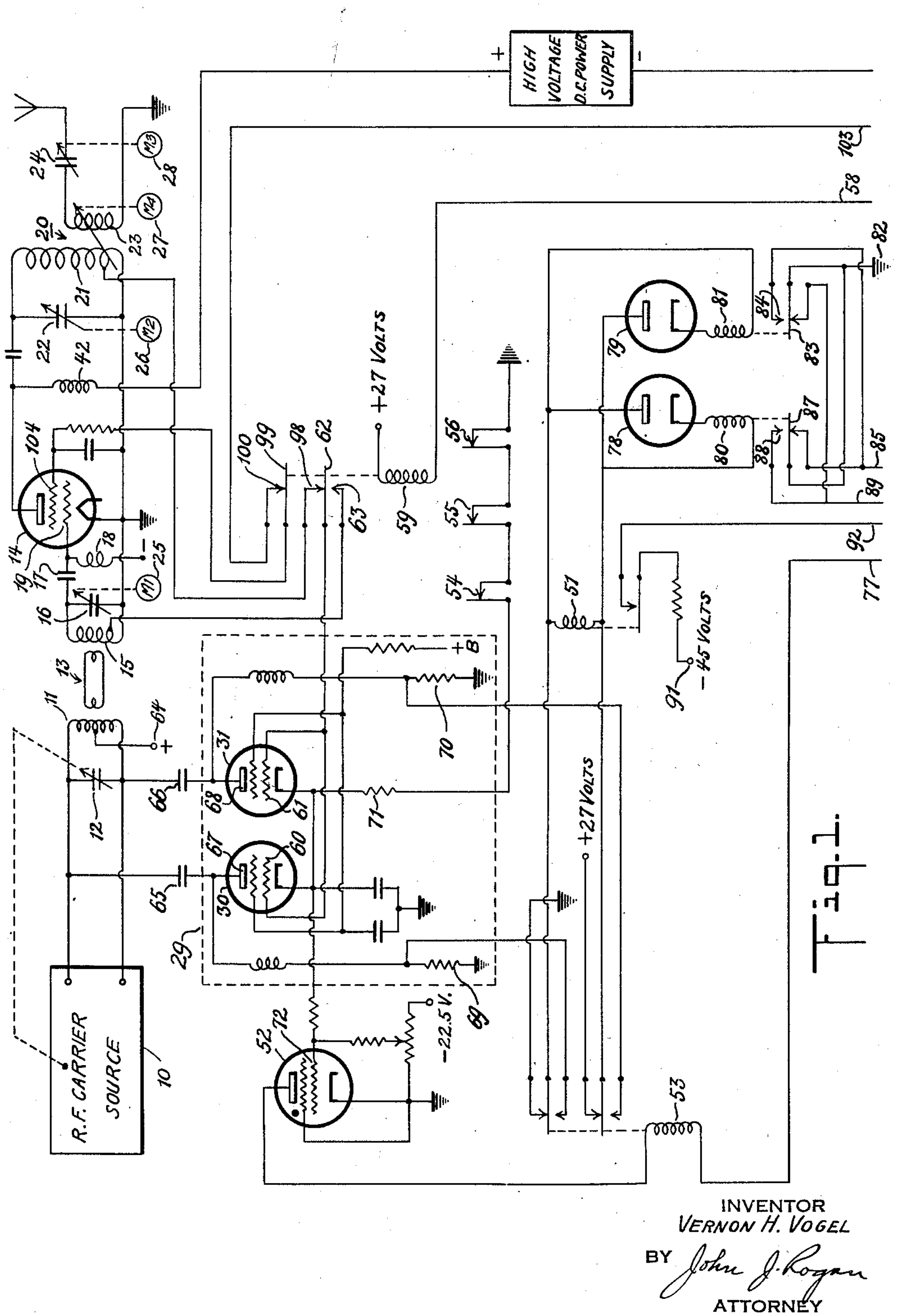
Fig. 1 is a schematic wiring diagram of a radio transmitter system and a portion of the automatic tuning and loading controls according to the invention.
Figure 2:
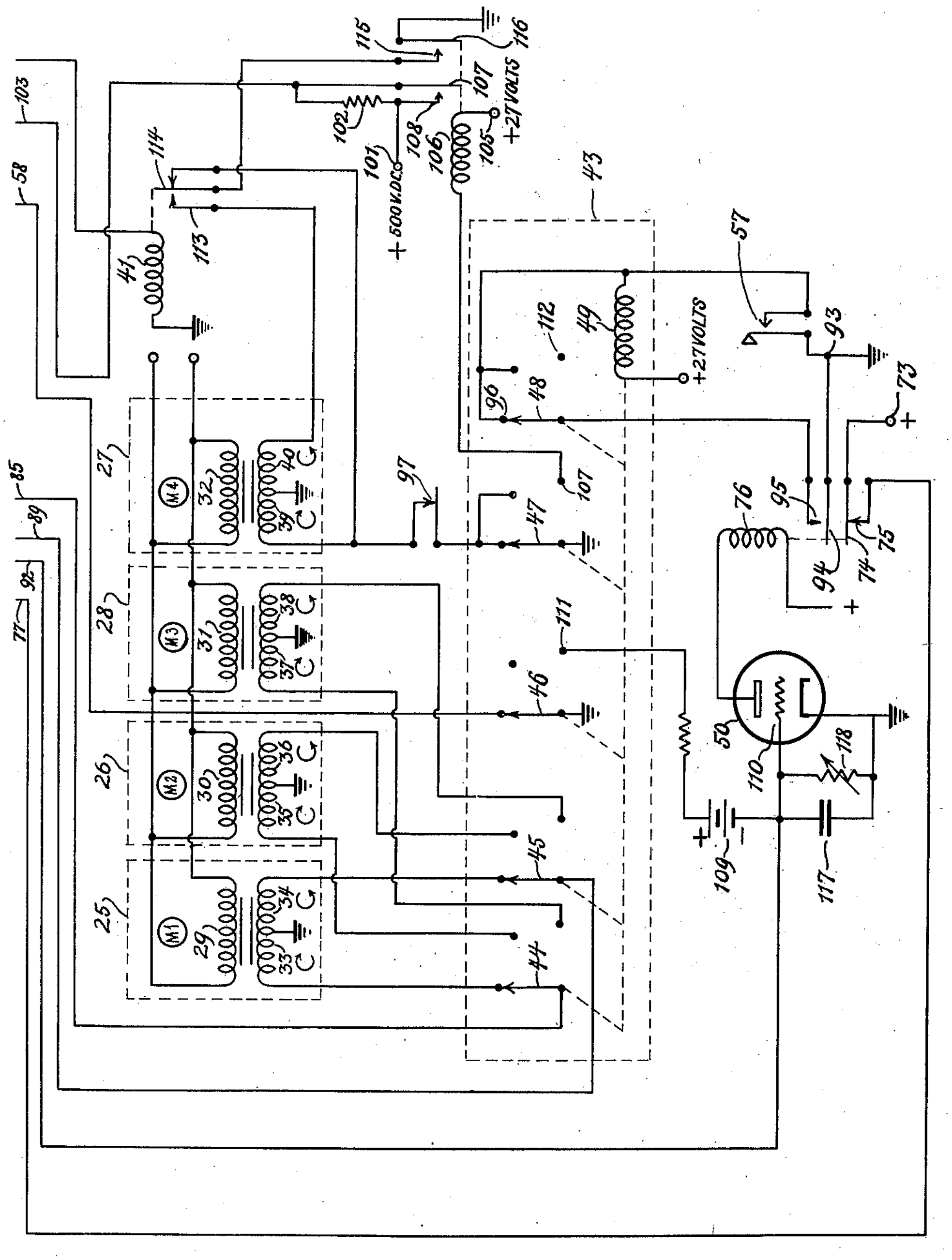
Fig. 2 is a schematic wiring diagram of the remaining portions of the automatic tuning and loading controls of Fig. 1.
Figure 3:
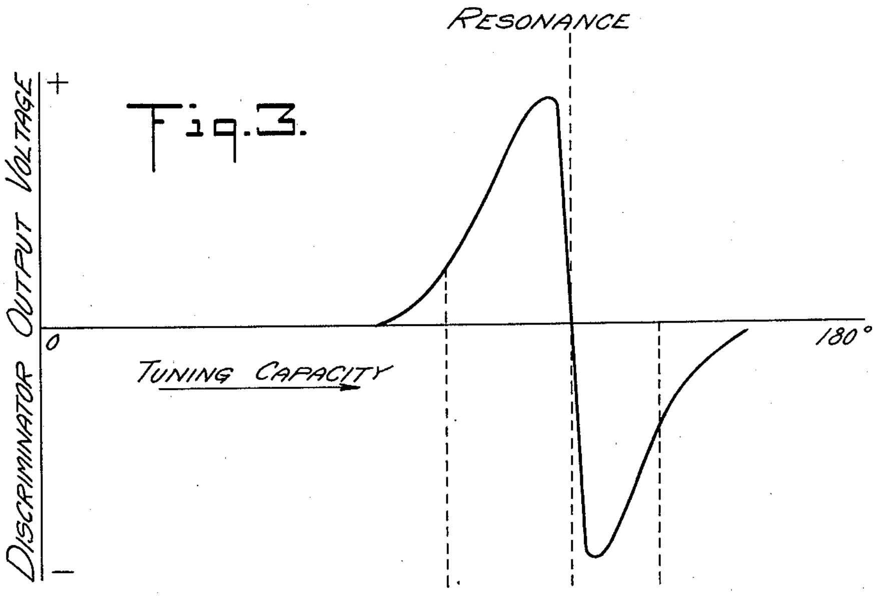
Figure 4:
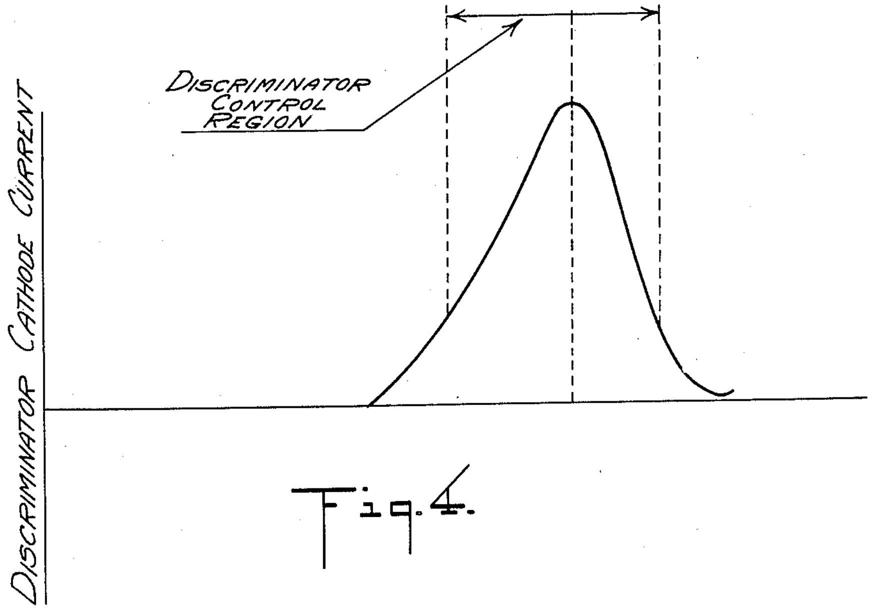

Figs. 3 and 4 respectively are graphs explanatory of the operation of Figs. 1 and 2.

While the invention will be described as embodied in a radio signalling system, it will be understood that the inventive concept is equally well applicable to other systems such as high frequency induction heating systems, or any similar system which requires automatic tuning of an amplifier to resonance and automatic loading of the output stage.

Referring to Fig. 1, there is schematically represented by the block 10, any well-known high frequency or radio frequency generator such for example as the usual adjustable frequency carrier generator, and if necessary, the usual frequency multipliers and amplifier stages of a radio transmitter. The output circuit of device 10 is represented by the inductance 11, with its parallel adjustable tuning condenser 12. This output circuit is coupled by the usual link circuit 13 to the tuned input circuit of the final amplifier tube 14. This input circuit comprises the inductance 15 and its parallel adjusting tuning condenser 16. If desired, a filter circuit comprising condenser 17 and high frequency choke 18, may be provided between the input circuit and the control grid 19. The output circuit of amplifier tube 14 includes an adjustable coupling transformer or variocoupler 20, whose primary winding 21 is tuned by variable condenser 22. The secondary winding 23 is connected in the antenna circuit which likewise can be tuned by the series condenser 24. Either or both of the windings of the variocoupler 20 may be rotatable to effect different coupling ratios between the amplifier and the antenna circuit.

Associated respectively with the condensers 16, 22, 24, and with the rotatable coil of the variocoupler 20, are the driving motors 25-28 (Fig. 2). Each motor may be of the automatic controlled shaded pole type, comprising main field windings 29—32, and respective pairs of shaded pole windings 33—34, 35—36, 37—38, 39—40. These motors are designed so that the direction of rotation is determined by which one of the shaded pole windings is short-circuited. The relative direction of rotation under control of the shaded pole windings is indicated schematically by the respective curved arrows. When both shaded pole windings of a given motor are short-circuited, that motor is quickly stopped and held in stopped position.

For the purpose of controlling the selective short-circuiting of the directional control windings of the motors, there is provided a phase discriminator 29, comprising a pair of tetrodes 30, 31, which are successively effective so as to compare the resonance conditions at the input of amplifier 14; at the output of amplifier 14; and at the antenna circuit. The motor 27 which tunes the variocoupler is controlled by a sensitive meter-type relay 41 which is connected in series with the high frequency choke coil 42 in the D. C. plate supply circuit of tube 14. The principle of quadrature relationship of voltages between coupled parallel-resonance circuits is utilized to control the discriminator 29.

In order to control the sequential operation of motors 25, 26, and 28, there is provided a stepping switch 43, comprising rotatable brushes 44—48, ganged together on a common shaft for unitary movement as represented by the dotted line connections. This common shaft has attached thereto the usual ratchet wheel (not shown) or similar step-by-step device which is actuated by a pawl (not shown) under control of the stepping magnet 49, so as to advance the brushes in a step-by-step manner. Each brush is associated with a set of three fixed contacts which are interconnected with the various motor windings as shown. To insure the proper timing in the stepping of the switch brushes, there is provided a special time relay tube 50, which in turn is controlled by a relay 51 responding to the difference in plate currents through discriminator tubes 30, 31.

The condensers 16, 22 and 24 are all of the 360° rotational type, that is to say when the rotor plates are fully meshed with the stator plates the condensers are at full capacity and as the rotor plates are rotated toward minimum capacity for 180°, this capacity decreases. As the rotation is continued through the next 180°, the capacity increases again reaching its maximum value. During each of these two 180° portions of rotation, there is a capacity value corresponding to resonance. However, during the first case resonance is reached as the capacity is decreasing, while in the second case resonance is reached during an increasing capacity relation. In order to eliminate faulty operation of the discriminator circuit, it is necessary to block out the discriminator action during one of these 180° portions. For this purpose, respective limit switches 54, 55 and 56 are provided for the respective condensers. These limit switches prevent operation of the discriminator during the unused 180° rotation of the respective condenser rotors by opening the common cathode return circuit of tubes 30, 31. In order to make sure that the rotor plates are always brought into the resonating portion of the condenser rotation so that the discriminator is always within its control region as indicated in Fig. 4, there is provided a grid-controlled Thyratron tube 52 which controls a relay 53. The arrangement is such that this discriminator control is assured so that the tuning motors for each condenser rotates in a clockwise direction unless the tuning condenser is already within the discriminator control range. When the rotor plates are out of this discriminator control range, the tube 52 is not plate conductive and the relay 53 is deenergized. As a result, a D. C. voltage, for example +27 volts, is applied in such a way as to cause the particular motor which is in circuit (dependent upon the position of switch 43) to continue rotating clockwise so as to bring the rotor plates into proper discriminator control range with the stator plates. When the condenser reaches discriminator control range, the cathode load voltage of tubes 30, 31, rises as shown in Fig. 4, causing Thyratron 52 to become conductive and thus causing operation of relay 53. Operation of relay 53 as will be described hereinbelow, connects the test relay 51 in circuit, and relay 51 maintains its contacts closed as long as there is sufficient difference of potential across the respective plate load resistors of tubes 30 and 31.

Assuming that the device 10 and condenser 12 have been adjusted to a new frequency setting, the manually operable button 57 is momentarily operated, closing a direct circuit from the +27 volt terminal through the winding of stepping switch magnet 49, causing the switch to return to normal position, wherein the brushes are all in contact with the #1 contacts of their associated sets, this position being shown in Fig. 2 of the drawing. It will be noted that when the stepping switch is in position #1, a circuit is completed from ground through brush 46 and its #1 contact over conductor 58 through the winding of relay 59. Relay 59 operates, and the control grids 60 and 61 are connected together and through the armature 62 and front contact 63 to the input inductance 15 of tube 14. If the input circuit of tube 14 is in resonance with the output circuit of device 10, the phase shift between these two circuits will be very close to 90°. Since the plates of both tubes 30 and 31 are connected to opposite phased sides of the inductance 11, and since the plus terminal 64 of the D. C. plate supply is connected to the center tap of inductance 11, the radio frequency exciting voltages that are applied through respective condensers 65, 66, to the plates 67, 68, are 180° out of phase. Consequently, with the two circuits tuned to resonance, the voltages generated across the respective plate resistors 69, 70, are equal. Under these conditions, a voltage will be developed across the common cathode resistor 71 which is applied to the control grid 72 of the Thyratron tube 52, causing it to be plate current conductive and completing a circuit traceable from the plus D. C. terminal 73, armature 74 and back contact 75 of relay 76, conductor 77, winding of relay 53, plate-to-cathode of tube 52 to ground. Relay 53 operates and connects the nongrounded terminals of the resistors 69, 70, across the winding of relay 51. Since the voltages developed across resistors 69, 70, are equal in the above-described resonance condition, relay 51 remains deenergized. However, equal currents flow through the rectifiers 78 and 79 and thence through respective relay windings 80, 81, which thereupon operate their associated contact sets. Thus, ground at point 82 is connected through armature 83 and contact 84 to conductor 85, switch arm 44 and contact 86 to the winding 33 of motor 25. Similarly ground is connected through armature 87 and contact 88 to conductor 89, switch arm 45, contact 90 to winding 34. Thus motor 25 remains at rest.

Since relay 51 did not operate, the negative 45 volt battery at terminal 91 is disconnected from conductor 92, and plate current is permitted to flow through the tube 50 and thence through the winding of relay 76. As a result, ground at point 93 is connected through armature 94, contact 95, switch arm 48, contact 96, through the winding of stepping relay 49 to battery. As a result, the switch arms 44—48 are advanced to their #2 contacts. As a result of this, the ground at switch arm 46 is disconnected from conductor 58, resulting in the release of relay 59. However, the brushes 47 and 48 continue to ground their respective #2 contacts. It should be noted that in positions #1 and #2 of switch arm 47, ground is extended through the normally closed contacts 97 of the limit switch which is controlled by motor 28. Therefore, winding 39 is short-circuited causing the motor 28 to rotate in a clockwise direction until the variocoupler 20 arrives at minimum antenna coupling whereupon the switch 97 is opened. The phase shift of the amplifier 14 is 180° so that the quadrature relationship between the tuned combination 15, 16, and the output circuit of amplifier 14 at resonance, is not destroyed.

Upon the release of relay 59 as above described, control grids 60, 61, of the discriminator are connected through armature 62 and contact 98 to the output circuit of the amplifier 14. Relay 59 at its armature 99 and contact 100 also applies a reduced screen grid voltage from the +500 volt terminal 101, resistance 102, conductor 103, to the screen grid 104, to facilitate resonating of the plate circuit of amplifier 14. If the plate circuit of amplifier 14 is at resonance, equal voltages will appear across relay 51 as above described, resulting in the grounding of both windings 35 and 36 of motor 26, whereupon relay 76 operates, as above described, and causes the stepping magnet 49 to move the switch arms 44—48 to position #3. In this position, a circuit is closed from the +27 volt terminal 105 through the winding of relay 106, switch contact 107 and switch arm 47 to ground. Relay 106 at its armature 107 and contact 108 short-circuits resistance 102, thus applying normal full screen voltage to the screen grid 104. If the condenser 24 is in the proper position for resonating the antenna circuit at the desired frequency, equal voltages appear across relay 51 as above described, resulting in the operation of relays 80 and 81, and the short-circuiting of windings 37 and 38 of motor 27 which therefore remains at rest. In this #3 position of the stepping switch, the negative bias battery 109 is connected between the control grid 110, switch contact 111 and switch arm 46 to ground. The application of this negative bias battery prevents operation of relay 76, permitting the discriminator and control circuits to retain control of motor 27 after the antenna resonating operation is completed. Furthermore in position #3, the operating circuit for the stepping magnet 49 is broken at contact 112, thus preventing further stepping motion of the switch except as desired by the manually operable switch 57 as above described. In position #3, the short-circuit for the left-hand winding 39 of motor 28 is removed and the winding 40 is short-circuited through the contact 113, and armature 114 of the meter type relay 41 and thence through the contact 115 and armature 116 of the previously operated relay 106. Motor 28 therefore begins to rotate so as to increase the coupling of the variocoupler 23. As this coupling increases, the plate current drawn by tube 14 also increases and introduces reactive components into the plate circuit thereof, which reactance components exist if the antenna circuit under control of condenser 24 is not tuned to resonance at the operating frequency. It should be noted that in position #3 of the stepping switch, the windings of motor 27 are still under control of the relay 51 and the rectified currents through the rectifiers 78 and 79. Since as above assumed the antenna circuit is in resonance, both windings 37 and 38 are short-circuited and motor 27 stays at rest.

The tuning cycle is thus completed and all motors are at rest. However, any changes which occur in the plate circuit or output of amplifier 14 or in the antenna circuit, which changes tend to destroy the condition of resonance, are automatically compensated for by the discriminator. In other words, the stepping switch remains in position #3 so as to connect the discriminator 29 and meter relay 41 continuously for control of motors 27 and 28. When it is desired to set the transmitter to a different radiating frequency, the generator 10 and tuning condenser 12 are reset to the new frequency and the manually operated button 57 is operated which results in the restoration of the stepping switch to its #1 position to repeat the foregoing cycle of operations.

In the foregoing description, it has been assumed that the elements 16, 22, 24 and 20 are all in the proper position for the desired resonance and plate loading. A description will now be given of the operation when all said elements 25—28 are off resonance and are off proper plate loading. With the stepping switch in position #1, let it be assumed that the generator 10 and the condenser 12 have been tuned to a different frequency. Under this condition, the phase relationship between the tuned combination 11, 12, and the tuned combination 15, 16, will not be equal to 90° and the voltage applied to the control grids 60 and 61 will have some angular leading or lagging quadrature relationship, thereby causing unequal voltages to appear across the resistors 69 and 70, depending upon whether the phase relation is leading or lagging. In other words, the voltage developed across said resistors 69 and 70 determines the amount of off resonance of the combination 15, 16, and the direction in which the motor 25 must be turned to restore the proper resonance.

However, if the grid circuit of amplifier 14 is very far from resonance, the voltage applied to the grids 60 and 61 may be so small as to develop insufficient voltage across resistors 69 and 70 for control purposes. Referring to Fig. 3, there is shown the graphical relation between the plate D. C. voltage output of the discriminator 29 plotted against capacity of tuning condenser 16 for a given frequency. Fig. 4 is a graph showing a plot of the discriminator cathode current against the same capacity of condenser 16. From these two graphs, it will be clear that the discriminator control is effective over only approximately one-third of the total tuning range of the condenser 16. It is important therefore, that regardless of the frequency setting of the system, the condenser 16 should at all times be brought within its effective control range. It is for this purpose that the Thyratron type tube 52 is provided. As above described, if the condenser 16 is so far off resonance as to develop insufficient voltage across the common cathode resistor 71, tube 52 is non plate-current conductive resulting in the deenergization of relay 53 which automatically continues to turn motor 25 in a clockwise direction so as to bring condenser 16 into effective resonance range. This is so because with relay 53 deenergized, +27 volts is applied through the contacts of relay 53 to the plate of rectifier 79, so that only this rectifier causes current to flow through relay 81 which thereupon operates to short-circuit the motor winding 33. When condenser 16 reaches the beginning of its effective resonating range, tube 52 begins to conduct and relay 53 operates, thus transferring the control of windings 33 and 34 to the respective discriminator resistors 69 and 70. Since it has been assumed that condenser 16 is off resonance, a voltage difference is applied across relay 51 resulting in its operation and the application of the negative 45 volt battery at terminal 91 to the grid of tube 50, thus preventing operation of relay 76. Furthermore, depending upon the relative magnitudes of the voltages developed at resistors 69 and 70, the proper one of the relays 80 or 81 will be operated so as to short-circuit the proper winding 33 or 34 of the motor 25, resulting in the rotation of a condenser 16 to the resonance point. At this point, relay 51 releases and motor 25 comes to rest. As above described, during the unused 180° rotation of the rotor plates of condenser 16, that is when these plates are not within the effective discriminator control region (as indicated in Fig. 4) the discriminator 29 is effectively removed from the control circuit by its respective limit switch 54.

A short interval after condenser 16 finally reaches the proper resonance position as determined by the time constant of the condenser 117 and resistor 118, the grid 110 is restored to sufficient bias to enable the tube 50 to be plate current conductive and resulting in the operation of relay 76. This immediately closes the circuit of stepping magnet 49 and rotates stepping switch to position #2. In position #2, the motor 26 is brought under control of the discriminator and since a new setting is required, the proper winding 35 or 36 of motor 26 will be short-circuited so as to rotate the condenser 22 to the resonating point. Here again, if the condenser is too far off resonance at the start, the motor circuit will be maintained closed under control of deenergized relay 53, and when the effective resonating range of the condenser is reached, relay 53 reoperates and places the windings of motor 26 again under control of the discriminator. Likewise, if the condenser 22 is rotated through its unused 180°, its associated limit switch 55 maintains the common cathode circuit of the discriminator open so as to insure sufficient rotation of the motor 26 to bring the condenser 22 into its effective resonating range. It should be observed that in positions #1 and #2 of the stepping switch, ground is extended through switch arm 46 and the associated first and second contacts and thence through the limit switch 97, to ground the winding 39 of motor 27, thus causing this motor to drive the variocoupler 20 to a position corresponding to minimum antenna coupling, whereupon the switch 97 opens and the motor stops. Also during position #2 of the switch, a reduced screen grid voltage is applied as above described to the screen grid 104. When resonance is reached, relay 18 releases resulting in the operation of relay 76 and the stepping of the switch to position #3.

In position #3, relay 106 operates to apply the normal screen grid voltage on screen grid 104. The discriminator 29 is now connected so as to control motor 28. Battery 109 also applies negative bias to grid 110 to prevent operation of relay 76, thus permitting the stepping switch to stay in position #3. Relay 106 being operated, the winding 39 is grounded through armature 113, contact 114, contact 115 and armature 116. This therefore results in an increase of the coupling to the antenna circuit. This also increases the plate current drawn by amplifier 14 and introduces reactive components into the plate circuit of that amplifier, which reactive components are dependent upon the off resonance of the antenna circuit. At the same time, the discriminator 29 is connected to control the motor 28 which causes the condenser 24 to be tuned to resonance. Since the meter relay 41 is connected directly in the D. C. plate circuit of tube 14, when the plate current rises above its rated value, relay 41 operates and short-circuits the winding 40, thus restoring the variocoupler 23 to the proper position corresponding to the rated plate current. In other words, relay 41 continues to increase the coupling between the antenna circuit and amplifier 14, and the discriminator continues to operate motor 28 until the antenna circuit is resonated and coupled to amplifier 14 and to that amplifier draws rated plate current at resonance. Thereupon, motors 27 and 28 stop and the complete system is tuned to resonance and proper antenna coupling. The stepping switch stays in its third position so as to provide a continuous check on the antenna tuning and upon the degree of antenna coupling through the variocoupler 23, thus providing an automatic control of the loading on the amplifier 14 so as to insure that the tube 14 draws its proper rated plate current at resonance.

While one particular embodiment has been described herein, it will be understood that various changes and modifications may be made therein, without departing from the spirit and scope of the invention.

What is claimed is:

1. In a wave transmission system, a first tuned circuit, a second tuned circuit, a motor for operating a tuning element of said second circuit to bring it into resonance with said first circuit said tuning element being of a type which is ineffective to tune said second circuit to resonance for approximately one-half of its movement, a limit switch operated when said tuned element reaches the limit of its resonating effectiveness, a first motor control circuit selectively responsive to a control voltage determined by the condition of resonance of said second circuit with respect to said first circuit, means to develop under control of the relative resonance conditions of the first and second circuits said motor control voltage with an effective control magnitude only when said tuning element is within effective resonating range at a selected frequency, and another motor control circuit controlled by said limit switch to restore said tuning element automatically to its effective resonating range.

2. A system according to claim 1 in which said other motor control circuit includes a relay which is effective when the first motor control circuit receives insufficient effective motor control voltage as a result of the "off" resonance of said second circuit, to render said other motor control circuit effective.

3. In a system of the character described, a first tuned section, a second tuned section, a third tuned section, an adjustable coupling between the second and third sections, respective motors for operating the tuning elements of said tuned sections and for adjusting the said coupling, an input device for the first section tuned to a preselected frequency, a network for producing motor control voltages determined by the comparative resonance settings of said input device and said sections successively, a step-by-step selector switch for automatically associating said tuned sections successively for control by said network and said input device, a first tuning motor for said first tuned section, a second tuning motor for said second tuned section, a third tuning motor for said third tuned section, a fourth motor for adjusting said coupling, each of said motors having a pair of directional control windings, said step-by-step switch being a three-position switch having a plurality of contact brushes, the first and second brushes in #1 position associating the windings of said first motor with said network, the third brush in #1 position being connected to a switching relay which associates the first tuned section with said network, the fourth brush in #1 position closing a circuit for only one of the directional windings of said fourth tuning motor to cause said coupling to assume a reference position, a fifth brush effective in #1 position to control the circuit of the stepping magnet of said switch, said first and second brushes in #2 position associating the motor windings of the said second motor in circuit with said network, said third brush in #2 position causing the said second tuned section to be associated with said network, said fourth brush in #2 position continuing the said circuit for the said one winding of said fourth tuning motor, the fifth brush in #2 position continuing the control circuit for said stepping magnet, said first and second brushes in #3 position associating the windings of the said third tuning motor for control by said network, said third brush in #3 position connecting a lock-out circuit for said stepping magnet, and said fifth brush in #3 position opening the circuit of said stepping magnet.

4. A system according to claim 3 in which, an amplifier tube is connected between said first and second tuned sections and said fifth brush in #1 and #2 positions is connected in circuit with a switching relay which reduces the potential on one of the electrodes of the amplifier tube, and in #3 position said fifth brush restores the said potential to normal.

5. A system according to claim 3 in which said fifth brush in #1 and #2 positions connects the said stepping magnet through a time delay device to insure that said stepping switch remains in its set position until completion of the automatic tuning of the respective tuned sections.

6. In a system of the character described, a source of radio frequency waves tuned to a selected frequency, an amplifier tube for said radio frequency waves, said tube having a tunable input circuit and a tunable output circuit, a tunable antenna circuit, an adjustable coupling between said antenna circuit and the output circuit of said tube, a pair of grid-controlled tubes having their plates connected in phase opposition for A. C. excitation across the said source, and their control grids connected in like phase through a switching relay to the said tuned input circuit, a common differential output circuit for said tubes, a test relay connected across said output circuit, a pair of oppositely poled rectifiers also connected across said output circuit, a pair of motor control relays each connected in series with a corresponding one of said rectifiers, a first tuning motor for said tunable input circuit, a second tuning motor for said tunable output circuit, a third tuning motor for said tunable antenna circuit, a fourth tuning motor for said adjustable coupling, each of said motors having a pair of directional control windings, a step-by-step switch for automatically associating the windings of said motors successively with said pair of motor control relays, means automatically advancing said switch successively from a first position to second and third positions as each of said tuned sections is automatically tuned to resonance with said source, means controlled by said test relay for delaying the successive stepping of said switch until the particular tuned section is automatically brought to proper resonance, each of said tunable circuits having a tuning element which is effective to resonate the associated circuit only over a limited portion of its movement, and another motor control circuit which is effective for automatically moving said tuning element into its effective tuning range.

7. A system according to claim 6 in which said pair of grid-controlled tubes have a common cathode load resistor, a grid-controlled gaseous conduction tube has its control grid connected to said cathode resistor so as normally to be plate current conductive only when a predetermined threshold differential voltage exists at the common output circuit of said tubes, a relay connected to be operated by the plate current of said gaseous tube, said relay when normal applying a conductive bias to only one of said pair of rectifiers to cause the particular motor which is connected in circuit by the stepping switch to rotate in a direction and to an extent sufficient to insure that the tuning element of the associated tuned section is brought within its effective resonating range.

8. In a system of the character described, an input device tuned to a selected frequency, an amplifier tube coupled to said device, said amplifier tube having tuned input and tuned output circuits arranged to be automatically resonated at said selected frequency, a phase discriminator for controlling the resonating of said circuits, a load circuit adjustably coupled to said output circuit, and means automatically effective when said tuned circuits are being automatically resonated for automatically reducing said coupling substantially to zero.

9. A system according to claim 8 in which said tube is of the tetrode type and means are automatically provided for reducing the normal voltage D. C. potential on one of the grid electrodes below its normal operating value while said tuned circuits are being automatically resonated.

10. A system according to claim 8 in which said phase discriminator comprises a pair of shield grid tubes having their plates excited in phase opposition by the wave energy from said input device, with the shield grids connected to a steady D. C. potential, and with the control grids connected in like phase through a switching relay effective in one position to connect said control grids to said tuned input circuit, and effective in another position to connect said control grids in like phase to said tuned output circuit.

11. In a wave transmission system, a first parallel tuned resonant circuit, a second parallel tuned resonant circuit coupled to the first circuit, at least one of said circuits having a movable tuning member which effectively resonates said one circuit only during a certain range of movement of said member, a reversible motor for operating said member, a phase discriminator having a pair of grid-controlled tubes with their control grids connected to the second tuned circuit for excitation in like phase, means to excite the plates of said tubes in phase opposition from said first circuit, a plate load device in the plate circuit of each of said tubes and having substantial voltages developed thereacross only when said movable member is in the range of its movement where it effectively resonates said one of said circuits, directional control circuits for said motor respectively controlled by said load devices, and means independent of said load devices and operating only when said movable member is in its range of movement where it does not effectively resonate said one of said circuits to close the particular directional control circuit for said motor which is required to bring said member into its effective resonating range of movement.

12. In a wave transmission system a first section to be tuned to resonance, a second section to be tuned to resonance with the first section, each of said sections having a tuning element which is effective to tune the associated section only during a fraction of the total range of movement of the member, a phase discriminator for comparing the phases of the wave energy in the said two sections to produce a pair of equal control voltages only when both sections are in resonance and to produce differential voltages when said sections are out of resonance, a pair of relays each selectively responsive to the magnitude and sign of said differential voltage, a reversible motor having a pair of directional control windings each controlled respectively by one of said relays, a connection from said motor to a tuning element of one of said sections for controlling its condition of resonance, and circuit connections independent of said control voltages for controlling the proper one of said directional control windings to cause the motor to move the tuning element of said one of said sections into its effective tuning range, said phase discriminator comprising a pair of grid-controlled electron tubes having their plates and control grids excited in phase quadrature by the wave energy in said first section and said second section, a pair of plate load resistors each connected in the plate load circuit of a respective one of said tubes, and a pair of differently polarized rectifiers connected in parallel between the high potential terminals of said load resistors.

13. In a wave transmission system a first section to be tuned to resonance, a second section to be tuned to resonance with the first section, each of said sections having a tuning element which is effective to tune the associated section only during a fraction of the total range of movement of the member, a phase discriminator for comparing the phases of the wave energy in the said two sections to produce a pair of equal control voltages only when both sections are in resonance and to produce differential voltages when said sections are out of resonance, a pair of relays each selectively responsive to the magnitude and sign of said differential voltage, a reversible motor having a pair of directional control windings each controlled respectively by one of said relays, a connection from said motor to a tuning element of one of said sections for controlling its condition of resonance, and circuit connections independent of said control voltages for controlling the proper one of said directional control windings to cause the motor to move the tuning element of said one of said sections into its effective tuning range, said discriminator comprising a pair of grid-controlled electron tubes having their plates excited by the wave energy from said first section and their control grids excited in like phase by the wave energy in the said second section, a plate load resistor for each tube; and said pair of relays are connected through a pair of rectifiers differentially to said plate load resistors.

14. In a wave transmission system a first section to be tuned to resonance, a second section to be tuned to resonance with the first section, each of said sections having a tuning element which is effective to tune the associated section only during a fraction of the total range of movement of the member, a phase discriminator for comparing the phases of the wave energy in the said two sections to produce a pair of equal control voltages only when both sections are in resonance and to produce differential voltages when said sections are out of resonance, a pair of relays each selectively responsive to the magnitude and sign of said differential voltage, a reversible motor having a pair of directional control windings each controlled respectively by one of said relays, a connection from said motor to a tuning element of one of said sections for controlling its condition of resonance, and circuit connections independent of said control voltages for controlling the proper one of said directional control windings to cause the motor to move the tuning element of said one of said sections into its effective tuning range, said discriminator comprising a pair of grid-controlled electron tubes having their plates and control grids excited by the wave energy in said sections to produce substantial motor control voltages in their respective plate load circuits only when a tuning element of said second section is in effective resonating range, a relay responsive to said control voltage below a pre-determined minimum, a motor for operating said tuning element, a selectively reversible motor circuit controlled by the said control voltage above said minimum, and a motor operating circuit controlled by said relay for insuring that said tuning element is brought into its effective resonating range so as to restore control of said selective motor circuit to said control voltage.

15. In a wave transmission system, a first tuned circuit, a second tuned circuit, a motor for automatically operating a tuning element of the second circuit to bring it into resonance with said first circuit, a first motor control circuit selectively responsive to the quadrature phase relation between said circuits, means to develop under control of said phase relation a motor control voltage which has an effective value for motor control purposes only when said tuning element is within its effective resonating range at a selected frequency, and another motor control circuit effective when said tuning element is out of its said effective resonating range for automatically restoring it to said range until the first-mentioned control voltage is of sufficient magnitude effectively to control said first motor control circuit, the first-mentioned motor control circuit including a phase discriminator which develops a differential motor control voltage in response to the phase quadrature relation between the wave energy in the first and second circuits, and the second-mentioned motor control circuit includes a grid-controlled gaseous conduction tube which is selectively conductive in response to the magnitude of the resonance voltage of the second circuit.

16. In a wave transmission system, a first tuned circuit, a second tuned circuit, a motor for automatically operating a tuning element of the second circuit to bring it into resonance with said first circuit, a first motor control circuit selectively responsive to the quadrature phase relation between said circuits, means to develop under control of said phase relation a motor control voltage which has an effective value for motor control purposes only when said tuning element is within its effective resonating range at a selected frequency, and another motor control circuit effective when said tuning element is out of its said effective resonating range for automatically restoring it to said range until the first-mentioned control voltage is of sufficient magnitude effectively to control said first motor control circuit, the first-mentioned motor control circuit including a phase discriminator which develops a differential motor control voltage in response to the phase quadrature relation between the wave energy in the first and second circuits; and the second-mentioned motor control circuit includes a grid-controlled gaseous conduction tube which is selectively conductive in response to the magnitude of the resonance voltage of the second circuit, a relay which is controlled by the plate-to-cathode current of said gaseous conduction tube, a pair of oppositely poled rectifiers connected in parallel across the output of said discriminator, said relay when operated rendering said rectifiers selectively conductive in accordance with the control voltage developed at the output of said discriminator, said relay effective when released rendering only one of said rectifiers conductive and independently of the output control voltage at said discriminator.

VERNON H. VOGEL.

REFERENCES CITED

The following references are of record in the file of this patent:

UNITED STATES PATENTS

| Number | Name | Date |
|---|---|---|
| 2,234,612 | Green et al. | May 26, 1942 |
| 2,358,454 | Goldstine | Sept. 19, 1944 |
| 2,374,729 | Cantelo | May 1, 1945 |
| 2,376,667 | Cunningham et al. | May 22, 1945 |
| 2,417,191 | Fox | Mar. 11, 1947 |
| 2,462,856 | Ginzton | Mar. 1, 1949 |
| 2,462,857 | Ginzton | Mar. 1, 1949 |

OTHER REFERENCES

"Auto Resonator Transmitter," Radio magazine, June 1939, pp. 9 to 13, 74 and 75.